United States Patent [19]

Nakatani

[11] Patent Number: 5,084,766
[45] Date of Patent: Jan. 28, 1992

[54] VIDEO SIGNAL REPRODUCING APPARATUS HAVING PAGE ROLLING PREVENTION

[75] Inventor: Yoshihiro Nakatani, Kanagawa, Japan

[73] Assignee: Canon Kabushiki Kaisha, Tokyo, Japan

[21] Appl. No.: 306,537

[22] Filed: Feb. 3, 1989

[30] Foreign Application Priority Data

Feb. 9, 1988 [JP] Japan .................................. 63-028037

[51] Int. Cl.$^5$ .......................................... H04N 5/783
[52] U.S. Cl. ................................. 358/335; 358/312; 360/10.1
[58] Field of Search ............... 358/312, 324, 311, 326, 358/335, 341, 342, 310; 360/10.1, 10.2, 10.3, 14.1, 14.2, 14.3, 11.1, 35.1, 70, 71, 72.1, 74.1, 84, 81, 64, 77.13, 77.12, 76, 70

[56] References Cited

U.S. PATENT DOCUMENTS

| | | | |
|---|---|---|---|
| 4,725,895 | 2/1988 | Miyamoto et al. | 358/312 |
| 4,725,898 | 2/1988 | Tokuyama | 360/10.1 |
| 4,737,864 | 4/1988 | Sekiya et al. | 360/10.1 |
| 4,772,975 | 9/1988 | Azuma | 358/312 |
| 4,796,104 | 1/1989 | Ito et al. | 360/35.1 |
| 4,796,123 | 1/1989 | Takeuchi et al. | 360/70 V |
| 4,800,447 | 1/1989 | Toba | 360/10.3 |
| 4,912,571 | 3/1990 | Tehiya et al. | 360/70 V |

Primary Examiner—Roy N. Envall, Jr.
Assistant Examiner—Huy Nguyen
Attorney, Agent, or Firm—Robin, Blecker, Daley & Driscoll

[57] ABSTRACT

A video signal reproducing apparatus forms a still picture signal by storing a reproduced video signal in a memory and then by repeatedly reading out the signal stored in the memory. The video signal reproducing apparatus forms a reference signal which is synchronized with the still picture signal read out from the memory, and controls the relative movement of a reproducing head and a recording medium on the basis of the reference signal.

12 Claims, 3 Drawing Sheets

STILL PICTURE REPRODUCTION

SWITCH-OVER OF OPERATION MODE

NORMAL REPRODUCTION

STILL PICTURE REPRODUCTION

SWITCH-OVER OF OPERATION MODE

NORMAL REPRODUCTION

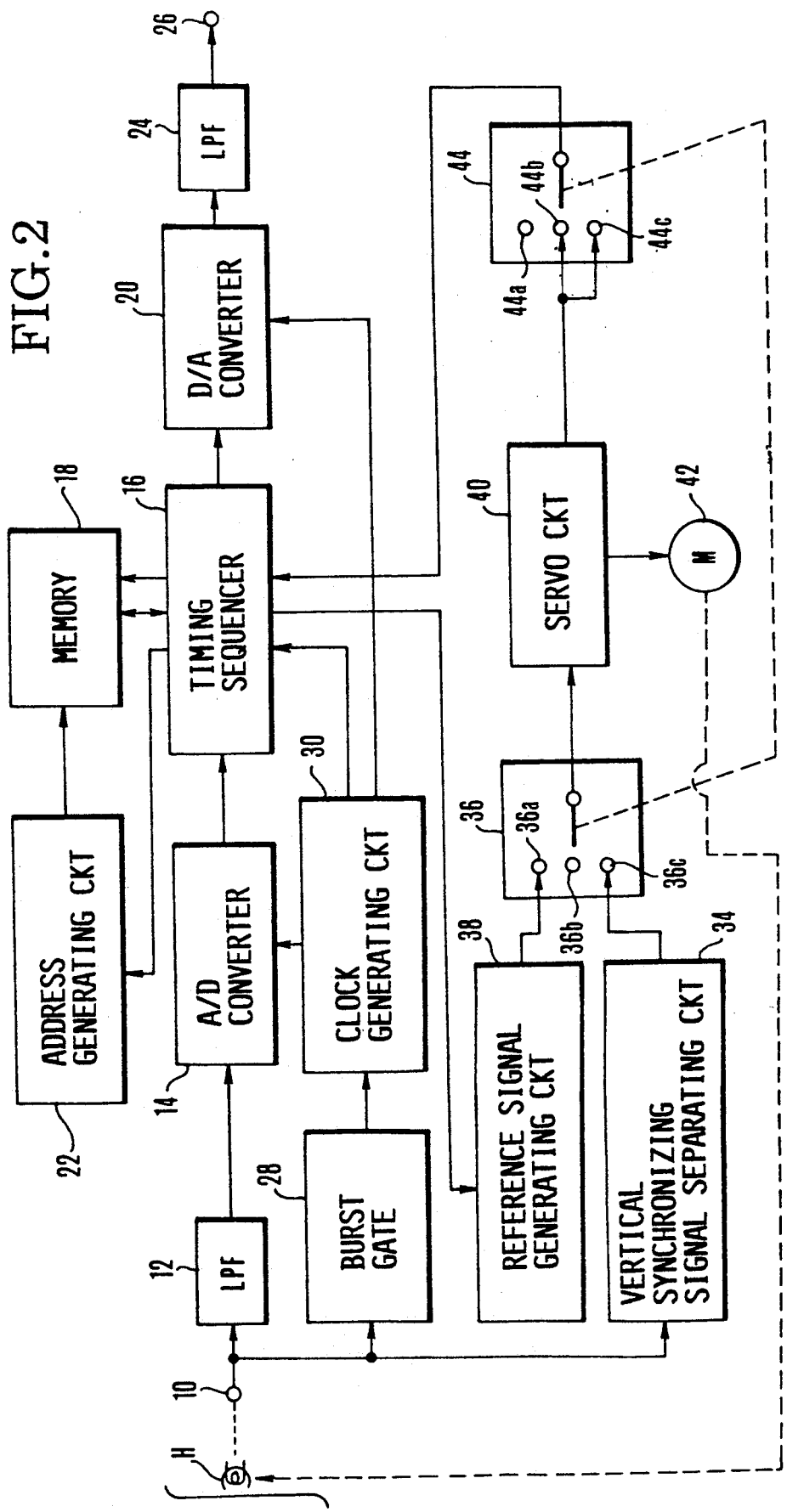

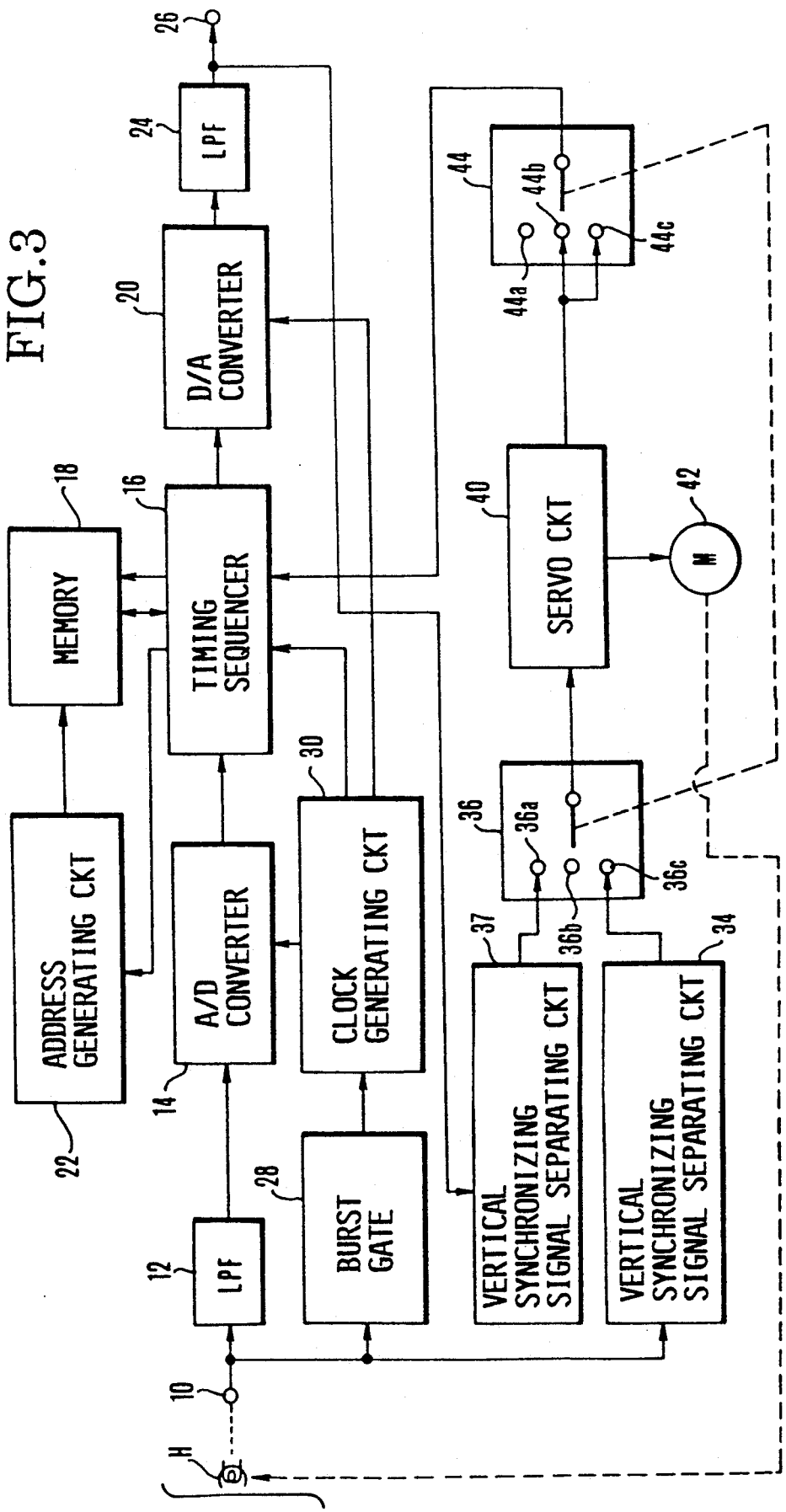

VIDEO SIGNAL REPRODUCING APPARATUS HAVING PAGE ROLLING PREVENTION

BACKGROUND O THE INVENTION

1. Field o the Invention

This invention relates to a video signal reproducing apparatus for reproducing a video signal, and more particularly, to a video signal reproducing apparatus which is capable of reproducing a still picture by utilizing a memory.

2. Description of the Related Art

Conventional video signal recording and reproducing apparatuses such as video tape recorders (VTRs) are designed to reproduce still pictures using a field memory. More specifically, since ordinary TV systems adopt the interlaced scanning system, if a video signal corresponding to one field is written in the field memory and the signal stored in the memory is repeatedly read out without alterations, skew of 0.5 H (1 H representing 1 horizontal scanning period) may be generated at the end of each field. It has therefore been proposed to write in the field memory a reproduced video signal corresponding to 0.5 H consecutively following the writing of the video signal corresponding to one field and to continuously read out from the memory a video signal corresponding to the entire period (one field and 0.5 H period, which corresponds to 263 H period in the case of the NTSC system). This arrangement serves to eliminate generation of skew.

However, in the above-described conventional reproduction technique, one vertical scanning period (corresponding to 262.5 H in the NTSC system) of a video signal which is reproduced by a reproducing head during still picture reproduction differs from that (corresponding to 263 H in the NTSC system) of the video signal read out from the memory, thereby gradually generating a phase shift between the two video signals. This results in a very ugly picture in which a vertical synchronizing signal appears on the screen of the TV monitor, as shown in FIG. 1, when the operation mode is switched over from the still picture reproduction to the normal reproduction, and when the video signal sent to the TV monitor is changed over from the video signal read out from the field memory to that reproduced by the reproducing head, the vertical synchronizing signal being gradually removed from the screen by the response of the TV monitor thereafter (this phenomena being called page rolling).

In order to prevent the occurrence of such phenomena, U.S. Pat. application Ser. No. 209,491 filed on June 20, 1988 and assigned to the assignee of this invention proposes to alternately read out video signals conforming to the NTSC system and representing 263 H and 262 H. However, this arrangement requires a relatively large scale circuitry arrangement, and is not therefore suited to use in an inexpensive small-sized video tape recorder with a camera incorporated therein.

SUMMARY OF THE INVENTION

A primary object of this invention is to provide a video signal reproducing apparatus which is directed to obviating the aforementioned problems of the conventional video signal reproduction apparatus.

A second object of this invention is to provide a video signal reproducing apparatus which is capable of preventing a reproduced picture signal from being disturbed by the discontinuity of vertical synchronizing signals which occurs when the operation mode is switched over from the still picture reproduction to the moving picture reproduction.

To this end, the present invention provides in one form a video signal reproducing apparatus which comprises a reproducing head for tracing a recording medium, memory means capable of storing at least one field of a video signal reproduced by the reproducing head, moving means for moving the reproducing head relative to the recording medium, reference signal generating means for generating a reference signal which is synchronized with a video signal read out from the memory means, and control means for controlling the moving means on the basis of the reference signal.

Other objects and features of the present invention will become apparent from the following description of the preferred embodiments thereof, taken in conjunction with the accompanying drawings.

BRIEF DESCRIPTION OF THE DRAWINGS

FIG. 2 is a schematic diagram of the essential parts of a video signal reproducing apparatus, showing a first embodiment of the present invention.

FIG. 3 is a schematic diagram of the essential parts of a video signal reproducing apparatus, showing a second embodiment of the present invention.

DETAILED DESCRIPTION OF THE PREFERRED EMBODIMENTS

Figure 1:
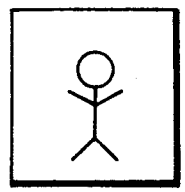
FIG. 1 illustrates page rolling phenomena.
Figure 1:
Figure 1:
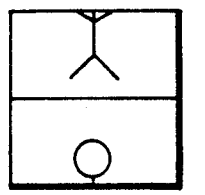
Figure 1:
Figure 1:
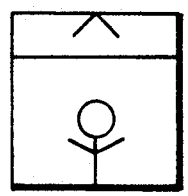
Figure 1:
Figure 1:
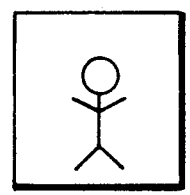

A first embodiment of the present invention will be described below with reference to FIG. 2 which is a block diagram of a video signal reproducing apparatus.

In FIG. 2, an input terminal 10 receives a composite color video signal in the recording mode. It also receives a composite color video signal which has been reproduced by a rotary head H and which has been passed through a reproduced signal processing system in the reproduction mode. The video signal which is input to the input terminal 10 is supplied to a low-pass filter (LPF) 12 where the frequencies above a certain point are removed. The resultant signal is supplied to an A/D converter 14 where it is converted into a digital signal, and the digital signal is then supplied to a timing sequencer 16. The timing sequencer 16 supplies a video signal to a field memory 18 or receives a video signal from the field memory 18, depending on the operation mode, and outputs a video signal to a D/A converter 20. More specifically, the timing sequencer 16 supplies the digital video signal which has been received from the A/D converter 14 to both of the field memory 18 and the D/A converter 20 during the through operation and the writing in the memory 18. Also, it supplies the digital video signal which has been read from the field memory 18 to the D/A converter 20 during the reading from the memory 18. An address generating circuit 22 generates a writing or reading address for the memory 18.

The D/A converter 20 converts the digital video signal output from the timing sequencer 16 into an analog signal. The analog video signal is supplied to a low-pass filter 24 where the frequencies above a certain point are removed, and the resultant signal is supplied to an output terminal 26. The signal output from the output terminal 26 is supplied to a TV receiver (not shown) in the reproduction mode and to the rotary head H through a recording signal processing system in the recording mode.

The composite color video signal received by the input terminal 10 is also supplied to a burst gate 28 where a color burst signal is separated from the composite color video signal received by the input terminal 10, and the separated color burst signal is supplied to a clock generating circuit 30. The clock generating circuit 30 generates a clock signal having a frequency of an integer times a subcarrier of a chrominance signal in synchronism with the color burst signal output from the burst gate 28, and supplies the clock signal to the A/D converter 14, the timing sequencer 16 and the D/A converter 20. In response to the clock signal output from the clock generating circuit 30, the timing sequencer 16 supplies to the field memory 18 a RAS (row address strobe) signal, a CAS (column address strobe) signal, a WE (write enable) signal and an OE (output enable) signal, which are used to write a signal in the field memory 18 and to read a signal from the field memory 18. Also, it supplies an address clock to the address generating circuit 22.

A vertical synchronizing signal separating circuit 34 separates a vertical synchronizing signal from the color video signal received by the input terminal 10, and supplies the separated vertical synchronizing signal to a contact 36c of a selection switch 36. A signal having a period corresponding to one period of the field memory 18 (which equals the time duration required for a certain address value to be designated subsequently after it has been designated once) is supplied to a reference signal generating circuit 38 from the timing sequencer 16. The phase of this signal has a certain relation with that of the digital video signal read from the field memory 18 or of the composite color video signal received by the input terminal 10. The reference signal generating circuit 38 generates a reference signal corresponding to the vertical synchronizing signal of the digital video signal or of the composite color video signal, and supplies the reference signal to a contact 36a of the switch 36.

The selection switch 36 is switched over in accordance with the operation mode of the apparatus. More specifically, a servo circuit 40 is connected to the contact 36c in the normal moving picture recording mode, to the contact 36a in the still picture reproduction mode, and to a contact 36b in another operation mode (for example, in the normal moving picture reproduction mode). Further, the timing sequencer 16 performs the through operation in the normal (moving picture) reproduction and recording modes.

The output of the switch 36 is supplied to the servo circuit 40. The servo circuit 40 controls the rotational phase of a drum motor 42 on the basis of the signal supplied from the switch 36. The drum motor 42 rotates a drum (not shown) to which a recording/reproducing rotary head H is fixed. In other words, the servo circuit 40 operates such that the rotational phase of the rotary head H and the phase of the video signal recorded or reproduced by the rotary head H have a certain relationship.

No signal is supplied to the contact 36b of the switch 36. Thus, in the operation mode other than the recording and still picture reproduction modes (e.g., in the normal reproduction mode), no reference signal is supplied to the servo circuit 40, and control of the rotational phase of the drum motor 42 is not performed. The motor 42 is rotated at a predetermined rotational speed at this time. The servo circuit 40 supplies a signal representing the rotational period and rotational phase of the rotary head H associated with the motor 42 contacts 44b and 44c of a selection switch 44. No signal is applied to a contact 44a of the switch 44. The operation of the switch 44 is associated with the operation of the switch 36. That is, the timing sequencer 16 is connected to the contact 44c during the recording mode, to the contact 44a during the reproduction of the still picture, and to the contact 44b in the another operation mode. The signal selected by the switch 44 is supplied to the timing sequencer 16.

The timing sequencer 16 adjusts the time duration of one period of the field memory 18 and determines the phase thereof in synchronism with the signal output from the switch 44. In consequence, in the operation mode other than the still picture reproduction mode, the field memory 18 is accessed in synchronism with the rotational period and rotational phase of the rotary head H. During the still picture reproduction, on the other hand, the period of the memory 18 is determined by a counter within the timing sequencer 16.

In this embodiment, in the operation mode other than the still picture reproduction mode, the contacts 36b and 44b of selection switches 36 and 44 or the contacts 36c and 44c are selected so that a certain relation is established between the rotational period and rotational phase of the rotary head H and the period and phase of the composite color video signal received by the input terminal 10. Further, the time duration and the phase of one period of the field memory 18 are determined in accordance with the rotational period and the rotational phase of the rotary head H. In consequence, the time duration and the phase of one period of the field memory 18 are synchronized with the period and the phase of the composite color video signal received by the input terminal 10.

In the still picture reproduction mode, the contacts 36a and 44a of the selection switches 36 and 44 are respectively selected, and the rotary head H is controlled such that the rotational period and the rotational phase of the rotary head H are synchronized with the period and the phase of the digital video signal read out from the field memory 18. Thus, when the still picture is reproduced, the writing in the field memory 18 is first conducted in synchronism with the composite color video signal received by the input terminal 10. Next, the digital video signal stored in the field memory 18 is read out. During this time, the rotary head H is rotated in synchronism with the video signal read out from the memory 18. As a result, the video signal read out from the field memory 18 is synchronized with the video signal reproduced by the rotary head H even in the still picture reproduction mode, eliminating the page rolling which occurs when the operation mode is switched over from the still picture reproduction mode to the normal reproduction mode.

Even if the period of the video signal to be stored in the memory 18 differs from that of the video signal read out from the memory 18, the above-described operational relationship establishes, although the rotational period of the rotary head H changes. Thus, even if a video signal representing 0.5 H is stored in the field memory 18 following one vertical period and the video signal representing the entire period is consecutively or repeatedly read out from the memory 18 when a still picture is to be reproduced in order to eliminate the occurrence of skew during the still picture reproduction, occurrence of the page rolling may be prevented, which occurs when the operation mode is switched over from the still picture reproduction to the normal reproduction.

In the above-described embodiment, the reference signal generating circuit 38, the switches 36 and 44 and the counter in the timing sequencer 16 may be constructed by a microcomputer.

Next, a second embodiment of the present invention will be described with reference to FIG. 3. In FIG. 3, the same reference numerals are used to denote the same parts as those in FIG. 2. A vertical synchronizing signal separating circuit 37 is operated in the same manner as that in which the vertical synchronizing signal separating circuit 34 is operated, that is, the vertical synchronizing signal separating circuit 37 separates a vertical synchronizing signal from the composite color video signal which is supplied to the output terminal 26, and supplies the separated vertical synchronizing signal to the terminal 36a of the switch 36.

More specifically, in the still picture reproduction mode, the servo circuit 40 controls the drum motor 42 such that the phase of the vertical synchronizing signal output from the vertical synchronizing signal separating circuit 37 has a certain relation with the rotational phase of the rotary head H.

It should be that the embodiment shown in FIG. 3 is as advantageous as the embodiment shown in FIG. 2.

As will be understood from the foregoing description, in the present invention, problems such as page rolling phenomena which occur when the operation mode is switched over from the still picture reproduction to the normal reproduction can be avoided, and the apparatus has a simple structure.

What is claimed is:

1. A video signal reproducing apparatus, comprising:
   (a) a rotary head for reproducing a video signal from a recording medium;
   (b) memory means for storing at least one field of the video signal reproduced by said rotary head;
   (c) driving means for driving said rotary head;
   (d) first means for generating a first signal which is synchronized with a video signal read out from said memory means;
   (e) second means for generating a second signal which is synchronized with a rotation of said rotary head; and
   (f) mode changing g means for changing over said apparatus between a plurality of modes, said plurality of modes including a first mode in which said driving means drives said rotary head without using said fist signal and said memory means reads out the video signal in response to said second signal, and a second mode in which said driving means drives said rotary head in response to said first signal and said memory means reads out the video signal without using said second signal.

2. an apparatus according to claim 1, wherein said first means generates said first signal which has the same period as a reading period of said memory means according to a reading out timing of the video signal.

3. An apparatus according o claim 1, wherein said first means includes a separation circuit for separating a synchronizing signal from the video signal read out from said memory means.

4. An apparatus according to claim 3, wherein said first means generates said fist signal in response to a vertical synchronizing signal separated by said separation circuit.

5. An apparatus according to claim 1, further comprising output means for selectively outputting the video signal red out from said memory means and the video signal reproduced by said rotary head.

6. An apparatus according to claim 5, wherein said output means outputs the video signal reproduced by said rotary head in said first mode and said output means outputs the video signal read out from said memory means.

7. A video signal reproducing apparatus, comprising:
   (a) a rotary head for reproducing a video signal from a recording medium;
   (b) memory means for storing at least one field of the video signal reproduced by said rotary head;
   (c) driving means for driving said rotary head;
   (d) separation means for separating a synchronizing signal from he video signal read out from said memory means;
   (e) generation means for generating a timing signal which is synchronized with a rotation of said rotary head; and
   (f) mode changing means for changing over said apparatus between plurality of modes, said plurality of modes including a first mode in which said driving means drives said rotary head without suing said synchronizing signal and said memory means reads out the video signal in response to said timing signal; and a second mode, in which said driving means drives said rotary head in response to said synchronizing signal.

8. An apparatus according to claim 7, wherein said driving means drives said rotary head in response to a vertical synchronizing signal separated by said separation means in said second mode.

9. A video signal recording and reproducing apparatus, comprising:
   (a) a rotary head for recording a video signal on a recording medium and for reproducing a video signal from the recording medium;
   (b) memory means arranged to be bale to store at least one field o the video signal to be recorded by said rotary head and the video signal reproduced by said rotary head;
   (c) driving means for driving said rotary head; and
   (d) first separation means for separating a synchronizing signal from the video signal to be written into said memory means;
   (e) second separation means for separating a synchronizing signal from eh video signal read out from said memory means; and
   (f) mode changing means for changing over said apparatus between a plurality of modes, said plurality of modes including a first mode in which said driving means drives said rotary head in response to said synchronizing signal separated by said first separation means, and a second mode in which said driving means drives said rotary head in response to said synchronizing signal separated by said second separation means.

10. An apparatus according to claim 9, wherein said rotary head records the video signal in said fist mode and said rotary head reproduces the video signal in said second mode.

11. An apparatus according to claim 9, wherein said plurality of modes further includes a third mode in which said rotary head reproduces the video signal and said driving means drives said rotary head without suing both of the synchronizing signals separated by said first and second separation means.

12. A video signal processing apparatus comprising:
a rotary head for recording a video signal on a recording medium and for reproducing a video signal from the recording medium;
(b) memory arranged to be able to store at least one field of the video signal to be recorded by said rotary head and the video signal reproduced by said rotary head;
(c) driving means of driving said rotary head; and:
(d) mode changing means for changing over said apparatus between a plurality of modes, said plurality of modes including a first mode in which said driving means drives said rotary head synchronized wit the video signal to be recorded by said rotary head and a second mode in which said driving means drives said rotary head synchronized with the video signal reproduced by said rotary head.

* * * * *